United States Patent [19]
Steitz et al.

[11] 3,757,020
[45] Sept. 4, 1973

[54] ELECTRIC GLASS FURNACE STRUCTURE

[75] Inventors: William R. Steitz, Toledo; Robert O. Bradley, Ottawa Hills, both of Ohio; Thomas H. Waterworth, Bridgnorth, England

[73] Assignees: Toledo Engineering Co., Inc., Toledo, Ohio; Elemelt Limited, Kingswinford, England

[22] Filed: Dec. 23, 1971

[21] Appl. No.: 211,196

Related U.S. Application Data

[63] Continuation-in-part of Ser. No. 41,385, May 28, 1970, Pat. No. 3,634,588.

[52] U.S. Cl. .................................................. 13/6
[51] Int. Cl. .............................................. C03b 5/02
[58] Field of Search .......................................... 13/6

[56] References Cited
UNITED STATES PATENTS
3,440,321  4/1969  Gell et al. .................................. 13/6

FOREIGN PATENTS OR APPLICATIONS
664,121  1/1952  Great Britain ............................. 13/6

*Primary Examiner*—Roy N. Envall, Jr.
*Attorney*—Hugh A. Kirk

[57] ABSTRACT

An electric glass furnace chamber having a bottom floor and side walls wherein the floor of the furnace is formed with a cruciform system of channels by means of which molten glass is withdrawn towards an outlet by opposing flow patterns in the channels thereby reducing flow patterns in the molten glass above the channels which avoids impingement of hot glass against the side walls of the furnace chamber and reduces erosion of these side walls. One or more axially movable electrodes connected to the same terminal project up through the bottom of the furnace between these channels, which electrodes are mounted in special refractory blocks that form platforms above the bottom floor of the furnace and thereby relatively deepen the channels between the electrodes connected to different opposing terminals. These platforms are built up in steps and the edges of their blocks are beveled. Furthermore, the electrodes may be arranged in groups so as to provide one or more separate heating zones connected by these channels. Each electrode is sealed in its refractory block by an inert gas, and it and its block are cooled both by a jacket for coolant liquid around the electrode at least partly recessed in the block, and by a blast of cool air from below and against the jacket, the electrode, and the bottom of the block.

13 Claims, 4 Drawing Figures

PATENTED SEP 4 1973

INVENTORS
WILLIAM R. STEITZ
ROBERT O. BRADLEY
THOMAS H. WATERWORTH
BY
*Hugh A Kirk*
ATTORNEY

INVENTORS
WILLIAM R. STEITZ
ROBERT O. BRADLEY
THOMAS H. WATERWORTH

BY Hugh A. Kirk
ATTORNEY

ELECTRIC GLASS FURNACE STRUCTURE

RELATED APPLICATIONS

This is a continuation-in-part application of copending U.S. application Ser. No. 41,385 filed May 28, 1970 by W.R. Steitz et al. now U.S. Pat. No. 3,634,588.

BACKGROUND OF THE INVENTION

1. Field of the Invention

This invention relates to electric furnace structures specifically adapted for melting or treating glass and silica.

2. Description of the Prior Art

Electric glass resistance furnaces need to be very carefully made of refractory brick so that once they are put into operation they will run for several months and preferably several years before having to be shut down. Thus it is important that as little corrosion and erosion as possible takes place during the life of a furnace.

However, a problem exists in furnaces of this type wherein molten glass is drawn off by way of an outlet channel in the floor of the furnace extending from a central region of the furnace chamber towards one of the side walls and extending generally beneath a heating zone in which the glass is traversed by electric currents. The movement of glass in a layer adjacent the floor tends to produce similar movement of a layer of glass near the surface by an entrainment effect. Whereas the lower layer of molten glass moves outwardly through the outlet of the furnace chamber, the upper stream of molten glass impinges on a side wall portion situated more or less vertically above the outlet and tends to produce accelerated wear by erosion and like effects locally at this position.

Also since the most heat generated in the electrical resistance of the molten glass is along the shortest path between the electrodes, it is desirable that this shortest path be spaced as far as possible from the bottom surface of the furnace to reduce the erosion on its refractory bricks and blocks.

Also with electrodes spaced apart peripherally around the side walls of the furnace and some current flowing between peripherally adjacent electrodes, it is inevitable that some of the current passes through layers of glass contiguous with the side walls and gives rise to heating and erosion thereof.

An example of an electric glass resistant furnace of the type involved herein is shown in Gell et al. U.S. Pat. No. 3,440,321 issued Apr. 22, 1969.

To overcome these problems, the bottom wall of the furnace disclosed in the above mentioned patent to Gell was provided with blocks forming raised portions through which the electrodes extend, thus raising the shortest distance between the electrodes in the molten glass above the bottom of the furnace. Withdrawal of glass was effected by way of an outlet means including an opening of trough-like form in the bottom wall of the furnace leading to an outlet in one of the side walls. Apart from the blocks and the trough-like opening the upper surface of the floor was of horizontal planar form. Glass was drawn into the trough-like channel from all localities over the floor surface except where the blocks projected thereabove.

SUMMARY OF THE INVENTION

Generally speaking, this invention embodies a novel electric glass furnace structure which comprises a melting chamber having side walls and a bottom floor, wherein the floor is formed with a system of crossing or intersecting channels which separate a plurality of electrodes. These electrodes may be separately axially and vertically movable and project above the floor through separate platforms for those of the electrodes connected to different electrical terminals. These platforms may be formed in steps of refractory blocks which have their exposed edges beveled so as to reduce the amount of surface which is in direct contact with the molten glass. The platforms may define the network of channels distributed over the floor with channels which feed an outlet means, including a trough, extending towards the trough from regions between peripherally adjacent electrodes, other regions, extending around the electrodes and up to adjacent portions of the side walls, being occupied by the platforms. This network may be so arranged as to include one or more channels traversing the floor between one pair of opposed side walls, at least one channel connecting these traversing channels, the trough communicating with this connecting channel in a region centrally thereof. Also a combination of water and air means may be provided for cooling each electrode and adjacent refractory block assembly.

This network or arrangement of channels which cross beneath each heating zone formed by four spaced platforms of electrodes, produce at least one pair of opposing flow paths for the molten glass in one channel towards its intersection with another channel or the trough. This opposing flow tends to produce a stationary pool of molten glass at such intersection which entrains the molten glass above it to continue the stationary pool to the surface of the molten glass, thus reducing erosion on the side walls of the furnace due to entrained flow of molten glass in the trough.

In one form of this invention, the electrodes define separate heating zones spaced horizontally in the furnace, which zones are connected by a channel in which the molten glass flowing form one zone opposes the flow of the molten glass from the other zone towards a junction from which an outlet trough may extend.

By the above network or arrangement of channels, molten glass tends to be withdrawn in a controlled manner from between each set of electrodes between which current passes through the glass, and systematic drift or impingement of upper layers of glass on a side wall of the furnace is minimized. Also the platforms reduce the depth of glass in the regions between the electrodes and the side walls and help to reduce the amount of current flowing in layers of glass adjacent to the side walls. Where the depth of glass is greater, namely over the channels, the glass is drawn away from the side walls by virtue of the glass flow pattern promoted by the channels. Also the current flow through the molten glass is spaced farther from the surface of the floor by the platforms for the electrodes, so that erosion of the bottom surfaces by an electrically heated molten glass is reduced.

Directly around each electrode an inert gas seal is provided. Also a cooling liquid jacket is provided around each electrode which is inserted into a cavity or recess in the bottom of the refractory block through which the electrode extends. By controlling the flow of the liquid, such as water, through this jacket, one can cause the natural glass seal, at the end of the inert gas directly around the electrode, to soften so that the electrode may be vertically moved as desired.

In addition to the liquid cooling of the electrodes and the refractory blocks through which they extend, jets of air are blown against the lower surfaces of the refractory blocks around the electrodes and their cooling jackets to further cool these parts.

OBJECTS AND ADVANTAGES

Accordingly it is an object of this invention to increase the life of an electric furnace by reducing erosion of the side walls, caused by flow of molten glass, by controlling such flow including the flow for the withdrawal of molten glass from the furnace.

Another object is to increase the distance between the current conducting heat paths in the molten glass from the surfaces of the refractories in the bottom of the furnace.

A further object is to reduce the thermal shock on the refractories around the electrodes.

BRIEF DESCRIPTION OF THE VIEWS

The above mentioned and other features, objects and advantages, and a manner of attaining them are described more specifically below by reference to embodiments of this invention shown in the accompanying drawings, wherein:

FIG. 1 is a schematic plan view of a resistance electrical glass furnace having two spaced heating zones showing a system of channels between electrodes projecting through the bottom thereof, a draw-off channel for the molten glass in the bottom and part of the riser duct therefrom, together with sawtooth electrical resistance lines between opposite terminals of the electrodes, with dotted resistance lines for the stray currents which also occur between the electrodes of other pairs of terminals;

FIG. 2 is a vertical section taken along jogged line 2 — 2 of the bottom part of the furnace in FIG. 1 showing the refractory blocks in which the electrodes are mounted as well as the channels between them and the bottom draw-off trough;

FIG. 3 is a schematic plan view of another embodiment of a resistance electrical glass furnace similar to that shown in FIG. 1, but having only one heating zone; and FIG. 4 is a section taken along line 4 — 4 of FIG. 3 showing an electrode in the riser from the draw-off trough, as well as a schematic means for vertically raising and lowering one of the electrodes in the furnace and the cooling means therefor.

DETAILED DESCRIPTION OF PREFERRED EMBODIMENTS

General

Figure 1:
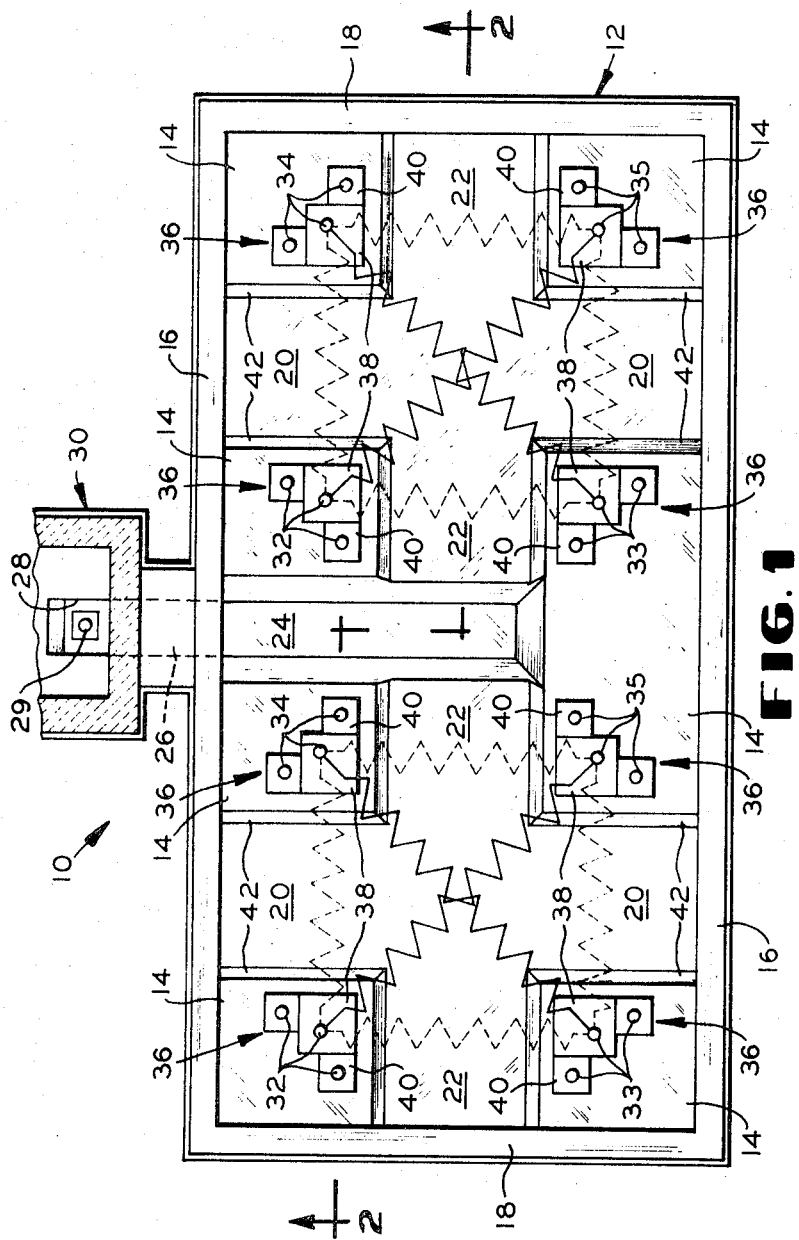
Figure 3:
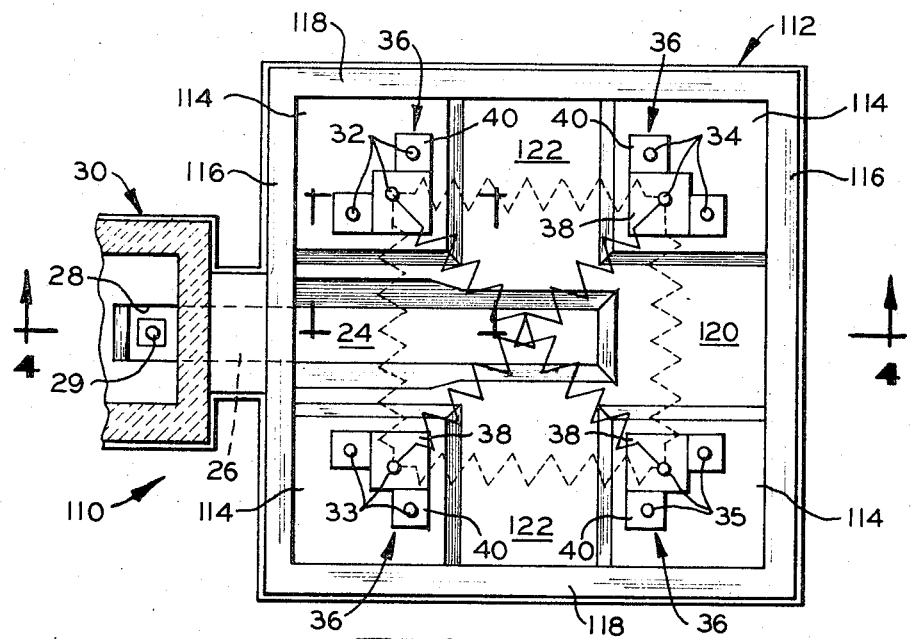

Referring to all the figures in general, and particularly to FIGS. 1 and 3, there are shown the general outlines of two embodiments of electric glass furnaces 10 and 110. The overall structure of these furnaces 10 and 110 are quite similar to each other in many respects and each employ similar elements. Thus these similar elements will be described together and identified by the same reference characters.

Furnace Tank Construction

As shown in FIGS. 1 and 3, the furnaces 10 and 110 have rectangular melting chambers or tanks 12 and 112 having a bottom floor 14 and 114 and side and end walls 16 and 18 for the tank 12 (see FIG. 1) and side and end walls 116 and 118 for the tank 112 (see FIG. 3), respectively, all of which are made of refractory brick.

Floor and Channel Network

Each floor 14 and 114 of the melting chambers 12 and 112, respectively, is formed with a system of crossing or intersecting channels 20 and 22 for the chamber 12 (see FIG. 1) and 120 and 122 for the chamber 112 (see FIG. 3). As shown in FIG. 1, the network of channels includes one or more channels 20 traversing the floor 14 between one pair of opposed side walls 16 and at least one channel 22 traversing the floor 14 between the end walls 18 and connecting these traversing channels 20. In the embodiment shown in FIG. 3, the channel 120 traverses the floor 114 between the side walls 116 and the connecting channel 122 traverses the floor 114 between the end walls 118.

Figure 4:
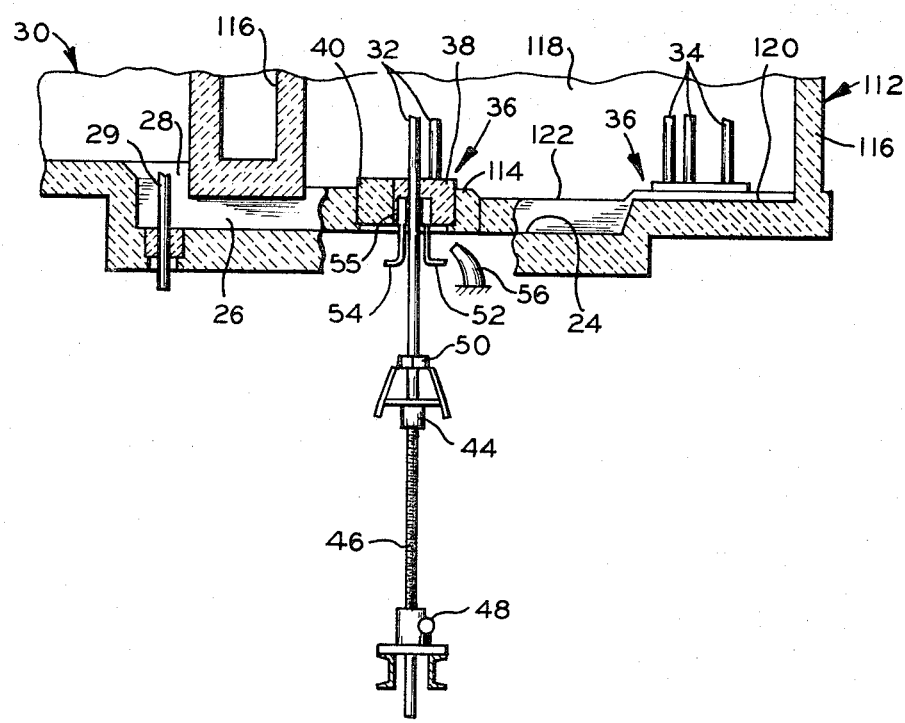

At the center of each bottom floor or wall 14 and 114 and extending part way across it is a lower outlet or draw-off channel or trough 24 which extends beyond the side wall 16 or 116 through a tunnel 26 into a riser 28 and thence into a molten glass distributing chamber 30 (see particularly FIG. 4). As shown in FIG. 1 the outlet trough 24 connects with the channel 22 while in the embodiment shown in FIG. 3 the outlet trough 24 coincides with the traversing channel 120 and intersects with the channel 122. An electrode 29 may be provided in the riser 28 to keep the molten glass liquid in the tunnel 26 and the distributing chamber 30, if an when the flow therethrough is reduced.

The Electrodes

Referring now to FIGS. 1 and 3, the network of intersecting channels for each embodiment separates a plurality of clusters of similar electrodes 32 through 35. These electrodes 32 through 35 project above the floors 14 or 114 through platforms 36 into the molten glass contained in the tank 12 or 112, but not above the surface of the molten glass. These plurality of clusters of electrodes 32 through 35 are arranged in groups of four which are relatively equally spaced with opposite terminals at the ends of the diagonals of squares on opposite sides of the intersecting channels 20 and 22 (see FIG. 1) or 120 and 122 (see FIG. 3). For example, the opposite terminal for the electrode cluster 32 is in the terminal for the cluster of electrodes 35, and in the same square, electrodes 33 are opposite electrodes 34. Although three electrodes are shown connected to each of the electrical terminals in these embodiments, one or more may be employed without departing from the general scope of this invention. However, the connection of more than one electrode to each terminal insures continuous operation in the event one or two of the electrodes at that terminal fails during the several months or years operation of the furnace. There is also shown schematically full sawtooth resistance lines diagonally across each square from the central electrode of each group to show in what direction the most heating electrical current normally flows through the molten glass in the tank when it is in operation. Nevertheless there is also some heating current flow between the electrodes 32 and 33, 32 and 34, 33 and 35, and 34 and 35. Thus heat is induced into the molten glass between all of the different electrode terminals or groups of electrodes 32 through 35 in each heating zone.

The Platforms

Figure 2:
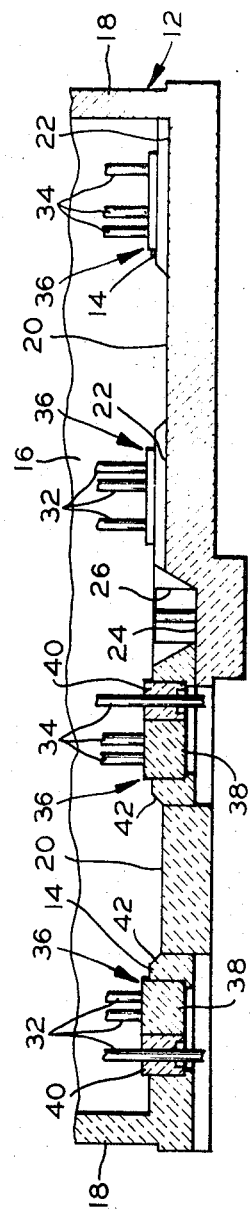

Referring back to FIGS. 1, 2 and 3, each of the electrodes 32 through 35 is individually mounted in separate special refractory blocks 38 or 40, which blocks in turn seat in additional special refractory blocks 42, the upper faces of which blocks 38, 40 and 42 are stepped above the floor or surface of the floor 14 or 114 in the tank 12 or 112, respectively, so as to help define the channels or troughs 20 and 22 or 120 and 122 which cross each other at the center of the groups or squares of the electrodes in their respective tanks 12 or 112. The stepped upper edges of the blocks 38, 40, and 42 may be beveled at their exposed corner edges to reduce the amount of the surface that is actually in contact with the molten glass in the tank adjacent their respective electrodes. Thus, the electrodes at each terminal are raised on platforms above the bottom surface of the tank so that electrical resistance between the electrodes connected to different terminals is shorter directly through the liquid than along the bottom surface of the tank. This reduces the amount of heat which is created on the skin layer of the molten glass against the refractories forming the bottom surface of the tank and upper surfaces of the blocks 38, 40 and 42. Accordingly, most of the heat from the electrical current goes directly into the molten glass, increasing the efficiency of the operation of the furnace, as well as increasing the life of the refractories making up its bottom, and specifically those blocks 38 and 40 directly supporting the electrodes. The platforms reduce the depth of glass between the electrode clusters and the side walls. At these localities the cross-sectional area of glass presented to current flow in layers adjacent to an extending along the side walls tends to be reduced. Where the depth has full value as over the channels 20, 22, 120, 122, the heated glass is drawn away from the side walls and erosion is reduced.

The Heating Zones

In the embodiment shown in FIG. 1, a group of electrodes 32 through 35 is provided in each end region of the generally rectangular furnace chamber 12, each of which groups defines a heating zone traversed by current represented by the full and dotted sawtooth resistance lines already mentioned. Between these two zones there is an intervening zone which is not traversed by main heating currents. Some current will flow in this region, e.g. sufficient to provide heating to compensate at least partly for heat losses. The cruciform shaped channel system previously described in each heating zone includes the channels 20 and 22 which extend from positions adjacent the side walls 16 and end walls 18 and act as collector channels withdrawing molten glass from the periphery of each zone. The flow in these channels 20 and 22 thus promotes down flow of cool glass over the interior surfaces of the side walls bounding each heating zone.

Withdrawal of molten glass from each heating zone takes place along the channel 22 of the system towards its mid region between the two heating zones. Thus the flow along this channel 22 takes place in opposite directions from each heating zone, so that there is a tendency to form a stationary pool of glass at its mid region or intervening zone.

From this stationary pool the outlet or draw-off channel 24 extends to the tunnel 26. If, therefore, there is any entrainment of surface glass in a direction towards the side wall 16 of the furnace chamber 12 above the channel 24, the portion of the side wall against which the glass impinges will be relatively cool since it is situated remotely from both of the heating zones.

Furthermore, any heated glass which migrates in the surface layer from each heating zone towards the mid region of the intervening zone by virtue of entrainment with glass withdrawn along the feeder channels 22 towards outlet channels 24, produces an accumulation or pool at the surface of the intervening zone in the central region thereof. Surplus glass thus tends to flow outwardly in a more or less uniform manner and migrate back to the heating zones without giving rise to any severe local impingement on the side walls 16 above the outlet channel 24.

Similarly, in the embodiment shown in FIG. 3, the flow of molten glass in channel 122 is from the side walls 118 towards the center of the heating zone to form a relatively stationary pool in the center of this heating zone. Furthermore, the outlet channel 24 from this pool does not materially increase the flow of molten glass against the side 116 above it by entrainment.

Electrode Mounting and Cooling

Referring now to FIG. 4, there is schematically shown one of the electrodes 32 projecting below the bottom wall of the tank 112 and resting in a socket 44 at the upper end of a screw 46 which may be raised and lowered via a drive gear and motor mechanism 48. Each one of the separate electrodes 32 through 35 are so connected to these devices 44, 46 and 48 for their vertical movement. Above each socket 44 there is shown a clamp means 50 by which an electrical connection is made to each electrode.

Also schematically shown is a duct 54 which passes a liquid coolant, such as water, through a jacket 55 partly inserted in the block 38 and surrounding the electrode 34 for regulating the temperature of the electrode to cause the molten glass to seal its upper end in the block 38. Also this serves to keep the electrode and its surrounding refractory block 38 cool.

Also in FIG. 4 there is schematically shown a duct 52 which directs an inert gas under pressure into the space in the block 38 which accommodates the jacket. This is to prevent air or oxidizing gases permeating the block and reaching the hot part of the electrode.

In addition to this liquid coolant 54, there is also provided a blast of cooling air via a duct 56, which is directed up into the bottom of the blocks 38 and 40 and around the outside of the jacket 55 and electrode 32 to cool further not only the electrode 32 but also the outer and lower ends of the refractory blocks 38 and 40 further reducing the chances of thermal shock to these parts. For example, in one installation, as much as 500 cubic feet of air per minute is blown on each group of electrodes.

The cooling of the blocks 38 and 40 enables the vertical heat gradient through these blocks to be maintained at a value which conforms at least approximately to that of the associated electrode 32 and thereby avoids or minimizes risk of cracking or disrupting the means sealing the electrodes with respect to the blocks.

Although the different features of this invention are related, they may be used separately or in different combinations if desired, without departing from the scope of this invention.

While there is described above the principles of this invention in connection with specific apparatus, it is to be clearly understood that this description is made only by way of example and not as a limitation to the scope of this invention.

We claim:

1. An electric glass furnace having a bottom and side walls, electrodes projecting up through said bottom, and a withdrawal trough in said bottom having an outlet in one of said side walls, the improvement comprising: channels in the bottom of said furnace leading from the walls through regions between the electrodes connected to different terminals to said trough which is connected to and between the ends of one of said channels whereby opposing molten glass flow occurs in said channel towards this connection to produce a stationary pool of molten glass thereabove reducing erosion of said side walls due to entrainment flow above said trough, the entire floor surface in regions around said electrodes and between said electrodes and adjacent portions of the side walls being higher than the bottoms of said channels.

2. A furnace according to claim 1 wherein said channels and trough intersect at right angles to each other to form a cruciform pattern in the bottom of said furnace.

3. A furnace according to claim 1 including platforms at the corners of said intersecting channels and trough for mounting said electrodes above the bottom floor of said furnace.

4. A furnace according to claim 1 including means for cooling said electrodes and the refractory blocks surrounding them, and wherein said means for cooling comprises both liquid and air.

5. A furnace according to claim 1 wherein said withdrawal trough extends beyond said one side wall of said furnace into a riser duct, and wherein said riser duct includes an electrode extending through the bottom of the trough under said riser duct.

6. An electric glass furnace comprising:
A. a melting chamber with side walls and a floor,
B. a plurality of electrodes separately axially and vertically movable projecting above said floor,
C. separate platforms for those of the electrodes which are connected to different electrical terminals, from which platforms said electrodes project vertically, said platforms being each formed of a plurality of refractory blocks forming steps to the top of said platforms from the bottom of a network of channels defined by said platforms and distributed over said floor, said channels extending between said electrodes connected to said different terminals, and said network including a plurality of channels traversing the floor between one pair of opposed side walls and at least one channel connecting said plurality of channels,
D. outlet means communicating with said network in a region centrally thereof, and
E. means for cooling each electrode and refractory block assembly.

7. A furnace according to claim 6 wherein said blocks have beveled edges toward the bottoms of said channels.

8. An electric glass furnace comprising:
A. a melting chamber with side walls and a floor,
B. a plurality of electrodes separately axially and vertically movable projecting above said floor,
C. separate platforms for the electrodes connected to different electrical terminals, each said platform being formed of refractory blocks comprising:
  1. a central block portion projecting above said floor and having a vertical aperture for each said electrode, and
  2. a seating block portion around and for said central block portion and projecting above said floor, said seating block portion substantially bridging the vertical distance between said floor and the top surface of said central block portion,
D. means for sealing said electrodes in said central block portions, and
E. means for cooling both said electrodes and block portions in the latter case below said floors.

9. An electric glass furnace according to claim 8 wherein said means for cooling said electrode comprises a water jacket around the lower end of said electrode, and said means for cooling said block portions comprises means for blowing air thereon.

10. An electric glass furnace according to claim 8 wherein said means are provided for supplying an inert gas around said electrode at the underside of said central block portion to provide a sealing against permeation by an oxidizing gas.

11. In an electric glass heating furnace comprising a chamber for containing a body of molten glass having a floor and upstanding side walls and an outlet positioned for withdrawing glass from the bottom of said chamber, and electrode means, the improvement comprising:
A. said electrode means defining separate respective heating zones situated in horizontally spaced regions of the chamber,
B. said chamber having open channel means in said floor defining a withdrawal flow path for the glass including feeder branches extending generally horizontally from the walls of respective ones of said zones adjacent to the floor of the chamber along mutually opposing directions towards a junction, and including an outlet branch extending from said junction to said outlet.

12. An electric glass furnace according to claim 11 wherein:
A. said electrode means are so positioned as to to define an intervening zone between said heating zones and bounded partly by the latter and partly by at least one side wall portion of the chamber,
B. said channel means defining said withdrawal flow path including:
  a. for each of said heating zones collector branches extending from positions adjacent to the side walls of the chamber bounding said heating zone towards a central region of said heating zone, and further including a feeder branch extending towards and opposing the corresponding feeder branch leading to said junction,
  b. an outlet trough extending from said junction in a direction transverse to the approach directions of said feeder channels towards said one side wall portion as viewed in plan.

13. An electric furnace according to claim 12 wherein:
A. the chamber is of generally rectangular form in plan, B. the electrode means are positioned to define respective ones of said heating zones in opposite end portions of said chamber leaving said intervening zone in between said heating zones in a central region of the length of the chamber, C. said collector channels extend in each of said heating zones from positions adjacent to the mid regions of said wall portions of the chamber bounding said zone towards the central region thereof, D. said feeder channels extend generally parallel to the larger plan dimension of the channel and lie medially of the smaller plan dimension thereof, E. said outlet trough extends from said junction in a direction generally parallel to the smaller plan dimension of the chamber towards the mid region of a side wall portion bounding the intervening zone.

* * * * *